Nov. 26, 1968          B. E. JOHNSON          3,412,813
                        CORE DRILL STAND
Filed June 15, 1967                      2 Sheets-Sheet 1
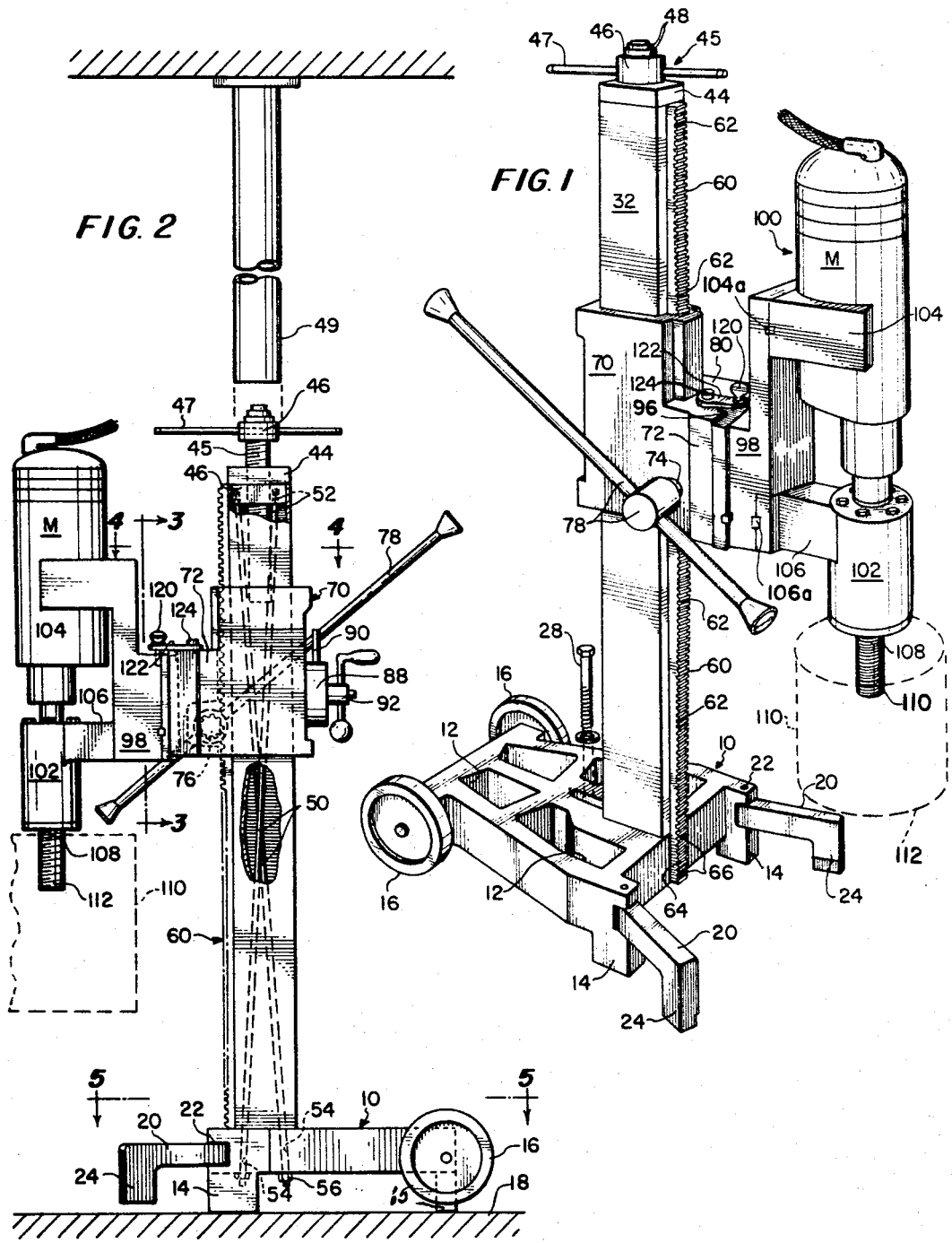
INVENTOR.
BERT E. JOHNSON
By Nov. 26, 1968   B. E. JOHNSON   3,412,813
CORE DRILL STAND
Filed June 15, 1967   2 Sheets-Sheet 2
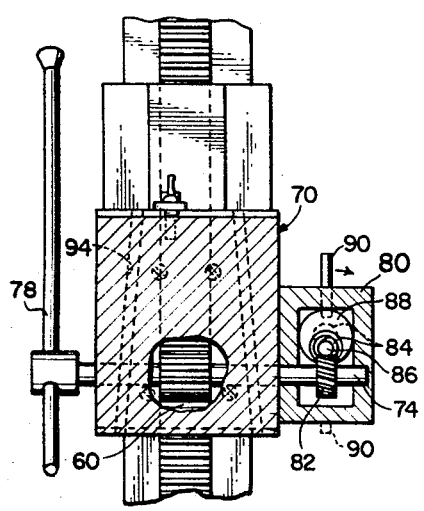
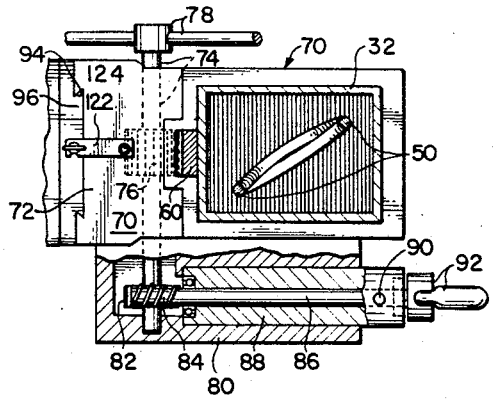
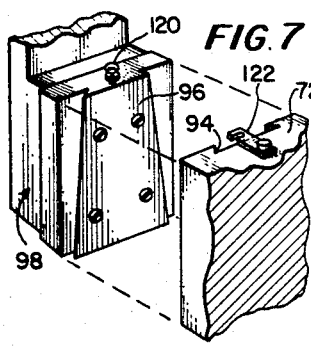
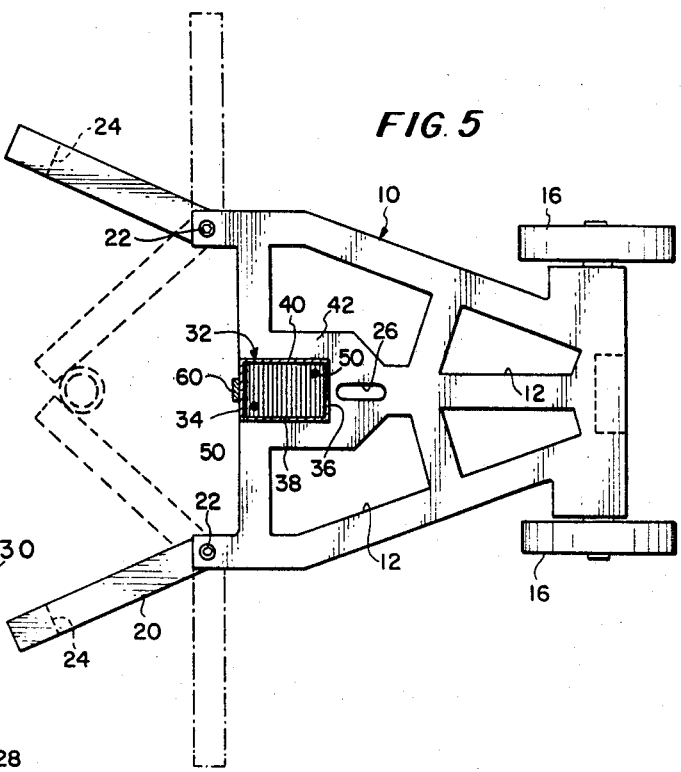
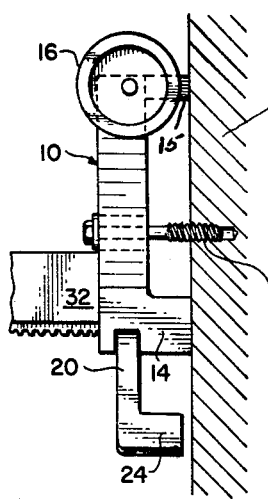
INVENTOR.
BERT E. JOHNSON
By *Norman Gerlach*

United States Patent Office 3,412,813
Patented Nov. 26, 1968

3,412,813
CORE DRILL STAND
Bert E. Johnson, 4423 N. Sheridan Road,
Chicago, Ill. 60640
Filed June 15, 1967, Ser. No. 646,218
7 Claims. (Cl. 173—141)

ABSTRACT OF THE DISCLOSURE

A core drill stand for operating upon concrete and similar hard materials. A wheeled base has a hollow tubular standard rigidly secured thereto and reinforced by internal struts. A vertically shiftable carriage detachably receives a motor and spindle unit and is provided with a coarse feed and a fine feed adjustment which are selectively operable. An outrigger device maintains the stand against undue tilting and such device also is used to steady the rotating core drill until the latter finds a center in the work being drilled. A self-tightening connection is provided between the carriage and the motor and spindle unit.

---

The present invention relates generally to drilling apparatus and has particular reference to a mobile core drill stand which is adapted to support the associated power-driven core drill so that it is capable of operating effectively and efficiently on highly resistant materials such, for example, as concrete, marble, granite and the like. More specifically, the invention is concerned with a core drill stand of the type that embodies a wheel-equipped base from which there projects upwardly a vertical standard on which the actual drilling apparatus including the core drill mount or carriage is vertically adjustable. The carriage of the stand serves as a medium for carrying or supporting the usual spindle for the core drill, together with the electric, pneumatic, or other motor by means of which the spindle is driven in connection with a drilling operation. A rack and pinion mechanism is provided for shifting the carriage vertically on the standard as is customary in connection with the particular type of core drill stand under consideration. Stands of this general character or type have long been known and used, but the present invention extends the usefulness of such stands, principally in that by a novel means of reinforcing the standard and base, each with respect to the other, there is provided an extremely rugged construction which is conducive toward more accurate and rapid drilling operations, especially in instances where large diameter core drills are utilized or employed for hole-drilling purposes.

In any core drilling operation, stability of the core drill mount is a factor of prime importance. A flimsy or wobbly mount or even a mount which does not maintain extremely fine mechanical tolerances against axial core drill inclination will not permit the drilling of relatively deep holes except where relatively small diameter drilling operations are concerned. Inasmuch as core drilling operations involve high frictional forces over a set of three cooperating and revolving abrasive surfaces, namely, two concentric, spaced apart cylindrical interfaces and one annular interface between certain adjacent rims of the cylindrical interfaces, any lateral displacement from the true drilling axis will result in a tremendous frictional drag over wide areas and consequent chattering or binding of the core drill within the circular hole undergoing drilling. Frequent stopping and restarting of the drilling operation is required and after a predetermined drilling depth has been reached, even the most skilled operator frequently finds that he is unable to proceed except possibly by core drill withdrawal, core fracture, core segment removal, and reinsertion of the drill into the thus cleared hole undergoing drilling. Where large diameter and deep holes are concerned, it has been found that a matter of hours may be consumed in the drilling of a single hole.

In order to attain the necessary ruggedness of frame structure for the drilling of large diameter and deep holes in concrete and similar hard materials with reasonable rapidity, it has heretofore been necessary to employ in connection with standard or conventional power-actuated core drills relatively massive frame structures which not only are extremely heavy but also consume considerable floor space, and consequently, such drills are removed from the category of "portable" tools. Additionally, such standard or conventional core drills cannot be maneuvered into small spaces such as areaways where drilling operations are to be performed. If horizontal drilling, in addition to vertical drilling, is contemplated, it is necessary to provide relatively massive bearings by means of which the main spindle and motor supporting castings of the drills may be swung to the desired drilling angle. With standard or conventional core drills, transportation of the drills to and from the scene of operations presents a problem, as well as hoisting or otherwise gaining entry of the drills into a building or other establishment where drilling operations are to be performed.

The present invention is designed to overcome the above-noted limitations that are attendant upon the construction and use of standard or conventional core drills, and toward this end, the invention contemplates the provision of a novel, lightweight, portable core drill stand which is capable of being used in connection with the drilling of holes of the order of twenty-four inches in diameter, yet which, even when completely assembled, is within the lifting capacity of a single operator so that it may be readily maneuvered into proper drilling position for either vertical or horizontal drilling operations. Moreover, the core drill mount which forms a part of the improved stand and the motor, the core drill spindle and the shiftable carriage, is made in separable parts so that the core drill stand, exclusive of the motor and spindle, may be moved into approximate drilling position and, thereafter, the motor and spindle may be applied thereto as a complete and single assembly, thus completing the installation so that after the necessary positional adjustments of the core drill have been made, drilling operations may immediately commence. In this manner, the operator is at no time encumbered with a workload that he cannot easily handle, even in a case where a horizontal hole is to be drilled in a wall at a relatively high overhead elevation.

The provision of a core drill stand such as has briefly been outlined above, and possessing the stated advantages, constitutes one of the principal objects of the present invention. It is a similar and related object of the invention to provide such a core drill stand in which the detachable interlocking connection between the motor and spindle assembly and the shiftable carriage is such that after the assembly has been attached to the carriage and the drilling apparatus as a whole put to actual use, such core drill pressure as may be manually applied against the work tends to tighten said detachable interlocking connection, thus rigidifying the core drill support during the actual hole drilling operation.

A further and important object of the invention is to provide a core drill stand in which provision is made for effecting a coarse feed movement or adjustment of the drill supporting carriage, as well as a fine feed movement or adjustment of said carriage, each adjustment being under the control of a power train to which manual force may be applied, and there being provision for disabling the power train which controls the fine adjustment at such time as the power train which controls the coarse adjustment is in use. Each power train not only controls the positioning of the carriage with respect to the work undergoing drilling, but also controls the manual pressure, i.e., the mechanical advantage, which is applied to the work, the fine adjustment power train affording an appreciably greater mechanical advantage or pressure against the work than the coarse adjustment power train. Thus, when a given depth of cut has been attained under the influence of relatively light manual pressure, further depth of cutting may be attained by switching, so to speak, from the coarse to the fine adjustment power train and thereby obtaining the necessary increase in pressure to enable further drilling operations.

It is yet another object of the invention to provide a core drill stand which employs the usual base and vertical standard for movably or slidably supporting the motor and spindle assembly supporting carriage, and in which novel means are provided for rigidifying the base and standard so that distortion of the standard under the torsional and flexing forces that are applied thereto during drilling operations are reduced to a minimum.

Other features of novelty of the present invention are the provision in connection with the improved core drill stand of a novel steadying means for the core drill proper at the commencement of drilling operations, such means remaining effective until such time as the core drill has found its normal center with respect to the work, and, in addition, the provision of a novel outrigger mechanism for lending stable equilibrium to the drill stand when otherwise unbalanced forces are applied thereto.

With these and other objects in view as will become readily apparent as the nature of the invention is better understood, the invention consists in the novel construction, combination, and arrangement of parts as shown in the accompanying two sheets of drawings forming a part of this specification.

In these drawings:

FIG. 1 is a perspective view of a core drill stand embodying the principles of the present invention;

FIG. 2 is a side elevational view of the improved core drill stand with certain parts broken away in order more clearly to reveal the nature of the invention;

FIG. 3 is an enlarged vertical sectional view taken substantially on the line 3—3 of FIG. 2;

FIG. 4 is an enlarged horizontal sectional view taken substantially on the line 4—4 of FIG. 2;

FIG. 5 is an enlarged horizontal sectional view taken substantially on the line 5—5 of FIG. 2; and FIG. 6 is a fragmentary side elevational view of the improved drill stand, illustrating the manner in which the stand may be employed for horizontal drilling purposes; and FIG. 7 is a fragmentary, exploded, perspective view illustrating a dovetail connection forming a part of the present invention.

Referring now to the drawings in detail and in particular to FIGS. 1 and 2 wherein a preferred embodiment of the invention is shown in its entirety, the improved core drill stand involves in its general organization a base 10 which is preferably in the form of a metal casting of generally trapezoidal configuration and has formed therein a series of plurality of relief areas 12 in order to minimize the weight thereof. At the front corners of the base there is provided a pair of relatively short depending legs 14 and such legs, in combination with a medial leg 15 at the rear edge of the base 10, afford a stable three-point support for said base on a supporting surface such, for example, as a floor 18. A pair of traction wheels 16 are carried at the rear corners of the base 10 and, when the latter is supported on the three legs 14, 14, 15, these wheels remain slightly elevated from the floor 18. The wheels 16 are provided solely for the purpose of transporting the drill stand when the latter is inclined to such a degree that these wheels travel on the floor or other supporting surface. A pair of outrigger arms 20 of L-shape configuration is hinged to the base 10 for independent swinging movement in a horizontal plane, the hinge connections 22 for said arms being disposed in the vicinity of the front corners of the base. These outriggers arms 20 are provided with depending foot portions 24 which are normally spaced slightly or infinitesimally upwardly from the aforesaid supporting surface but which, when the arms are extended in a generally forward direction, are engageable with such supporting surface to prevent appreciable forward tilting movement of the stand as a whole due to any unbalanced forces which may be applied to the stand due to the gravitational weight of the core drill proper and its mounting when the latter is operatively mounted on the stand. A longitudinally extending slot 26 is formed in the medial region of the base 10 and is adapted to receive therethrough the shank portion of an anchor bolt 28 by means of which said base may be bolted to a vertical wall surface such, for example, as that shown at 30 in FIG. 6 when the core drill stand is employed for horizontal drilling purposes. Such use of the core drill stand will be described in greater detail subsequently.

Projecting vertically upwardly from the central portion of the front region of the base 10 is a vertical standard 32 which is essentially of hollow tubular construction and is rectangular in cross section. As best illustrated in FIG. 5, this standard comprises a front wall 34, a rear wall 36, and opposed, spaced apart, side walls 38 and 40. The rectangular lower open rim of the standard 32 seats squarely on a solid portion 42 of the base 10. The rectangular upper rim of the standard 32 is closed by a cap member 44, the lower portion of which projects slightly into the standard and is provided with a downwardly facing marginal shoulder 46 which seats upon the upper rim of the standard.

The cap member 44 is provided with a wedge screw assembly which comprises a vertical wedge screw 45. The latter is threaded through the cap member and projects downwardly into the confines of the upper portion of tubular standard 32 an appreciable distance as shown in FIG. 2. The upper end of the wedge screw 45 is formed with a head portion 46 through which there extends slidably a horizontal operating bar or torque rod 47. The upper region of the head portion 40 is formed with a vertical series of annular steps 48, such steps constituting different diameter reaction shoulders selectively receiving thereon the lower rims of varying size, upstanding, tubular posts such, for example, as the post 49. Such posts may be cut to length and when one of them is positioned on a shoulder or step 48 of corresponding diameter, such one post constitutes a thrust member by means of which the core drill stand as a whole may be effectively wedged in position between the subjacent supporting surface (floor 18) and an overhead ceiling as shown in FIG. 2.

In order to render rigid the standard 32 and the base 10 as a unit, a pair of diagonal, rod type, tension struts 50 is disposed within the confines of the tubular standard 32. The upper ends of these two struts are threadedly received as at 52 in the cap member 44 near two diagonally opposite corners thereof, and the lower ends of said struts pass through spaced apart bores 54 in the base 10 and are anchored in position by way of nuts 56 which are threadedly received thereon. The bores 54 are diagonally disposed with respect to the attachment regions for the upper ends of the struts with the result that the two struts cross each other in the medial region of the standard as shown in FIG. 2. By means of the nuts 56 the struts 50 may be placed under an appreciable degree of tension thus drawing the lower rim of the standard 32 hard against the upper surface of the base 10 to the end that the standard is possessed of a high degree of stable equilibrium on the base and will not tilt with respect thereto under the influence of drilling pressure when the core drill stand is in operation.

In order further to render rigid the standard 32 on the base 10, an elongated, vertically disposed rack 60 is secured by screws 62 or the like to the front wall 34 of the standard 32 and the lower end region of this rack overhangs the lower end of the standard as indicated at 64 in FIG. 1 and is secured to the front face of the base 10 by attaching screws 66. The rack, in addition to constituting an element of a gear-type power train as will be described presently, is extremely effective in preventing rearward tilting of the standard 32 on the base 10 since any tendency for such tilting is opposed by the application of tension in the rack 60 near its lower end region of overhang.

Still referring to FIGS. 1 and 2, and additionally to FIGS. 3 and 4, a core drill supporting carriage 70 is movably mounted on the standard 32 for vertical movement therealong in opposite directions. This carriage is preferably in the form of a casting which is of generally tubular configuration and surrounds the standard 32, the casting being generally rectangular in cross section. The lower region of the carriage 70 is provided with a forwardly offset portion or extension 72 within which there is rotatably journalled a horizontally and transversely extending main operating shaft 74 which constitutes an elevation shaft by means of which the elevation of the carriage on the standard 32 may be regulated. This shaft 74 has fixedly connected thereto a pinion 76 which meshes with the rack 60 in such a manner that upon rotation of the shaft 74 in opposite directions, the carriage 70 will be raised or lowered upon the standard 32, as the case may be, depending upon the direction of rotation. An operating handle assembly 78 of the slide bar type is mounted on a projecting end of the shaft 74 and affords an appreciable degree of leverage by means of which the shaft 74 may be manually turned in either direction.

The lower region of the carriage 70 is also provided with a lateral offset portion 80 (see FIG. 3) which is, in effect, a continuation of the forwardly offset portion 72 and into which one end of the main operating shaft 74 extends. Said one end of the shaft 74 has fixedly mounted thereon a worm wheel 82 which is designed for selective meshing engagement with a worm 84 on a horizontally extending auxiliary operating shaft 86. The latter is journalled in an eccentric sleeve 88 which, in turn, is rotatably disposed in the offset portion 80 of the carriage 70. Said auxiliary operating shaft 86 extends at right angles to the main operating shaft 74 and is disposed in close proximity thereto. One end region of the eccentric sleeve 88 projects outwardly of the carriage 70 and carries an operating handle 90 (see FIGS. 3 and 4) by means of which the eccentric sleeve may be rotated throughout an angle of approximately 180°. When the handle 90 projects vertically upwardly as shown in full lines in FIG. 3, the worm 84 meshes with the worm wheel 82 on the auxiliary operating shaft 86. When the handle 90 projects vertically downwardly as shown in dotted lines, the worm and worm wheel are out of meshing engagement. The outer end of the auxiliary operating shaft 86 has mounted thereon a conventional fast-spin type crank 92.

Referring now to FIGS. 1 to 4, inclusive, the front face of the forwardly offset portion 72 of the carriage 70 is provided with a comparatively wide, vertically extending, upwardly tapered, dovetail groove 94. This groove is designed for reception therein of a counterpart dovetail protuberance 96 which is formed on the rear face of a casting 98 and tapers upwardly in conformity with the dovetail groove 94, constitutes the base member of a prefabricated electric motor and core drill spindle assembly or unit which is designated in its entirety by the reference numeral 100. As best illustrated in FIG. 1, this unit 100 includes, in addition to the casting 98, a gear head type electric motor M and a core drill spindle and sleeve assembly 102. The details of the unit 100 have not been fully disclosed herein since, apart from the dovetail protuberance 96 on the casting 98, no novelty is predicated upon this unit per se. It is deemed sufficient for purposes of disclosure herein to state that the lower portion of the motor casing which houses the gear drive embodies a holder portion 104 which is removably connected to the upper end of the casting 98 by means including a horizontal key 104a, and also that the assembly 102 is provided with a holder portion 106 which is removably secured to the lower end of the casting 98 by means including a horizontal key 106a. The motor M has its operating shaft disposed in axial alignment with the core drill supporting spindle 108 and the latter is rotatably journalled in any suitable manner as, for example, by internal roller bearings (not shown) within the assembly 102. The lower end of the spindle 108 is externally threaded as at 110 for selective and threaded reception thereover of a plurality of different diameter core drills such, for example, as the core drill 112 which is shown in dotted lines in FIG. 1.

Inasmuch as the mating dovetail groove 94 and dovetail protuberance 96 taper upwardly, it is necessary to provide a means for supporting the casting 98 so that it will not fall by gravity from the carriage 70 when the core drill stand is not in operation. Accordingly, as shown in FIGS. 1, 2 and 4, an upstanding, head-equipped latch pin 120 on the casting 98 is designed for cooperation with a latch member 122 which is pivoted at 124 to the upper face of the extension 72 on the casting 70 and is formed with a notch 126 in the distal end region thereof. When the casting 98 is in its operative position on the extension 72, the pivoted latch member 122 may be swung so that its outer end underlies the head of the latch pin 120 with the edges of the notch 126 straddling the portion of the pin that is directly beneath the head on the pin.

In the operation of the herein described core drill stand, the entire stand assembly may be wheeled to a given scene of operations by tilting the same slightly forwardly so that the wheels 16 are effective on the subjacent supporting surface and constitute the sole supporting means for the assembly. The assembly may then be wheeled to a position wherein the vertical axis of the core drill 110 coincides with the vertical axis of a hole to be drilled in the floor or other horizontal supporting surface. When in such position, the base 10 will then be caused to have a three-point suspension on the two front legs 14 and the rear leg 15, while the wheels 16 will assume their raised positions as shown in FIG. 2.

It will be understood that the core drill stand including the base 10, the standard 32, and the carriage 70 is designed for selective cooperation with any one of a series or group of the motor and core drill spindle units 100. These may be prefabricated with different and varying motor and core drill ratings for different work capacities. Each of said units will be provided with a dovetail protuberance 96 for cooperation with the dovetail groove 94 in the front face of the forwardly offset portion of the carriage 70 and each will have its individual latch pin 120 thereon for cooperation with the pivoted latch member 122. It will also be understood that application of a unit 100 to the drill stand proper may be made either at the scene of drilling operations or at a location remote therefrom. Where a large size unit 100 is employed, it may be found convenient to transport the drill stand proper and the selected unit 100 separately to the drilling location and to assemble them thereat in the interests of lessening the total load which any one operator is obliged to transport.

With the assembled core drill stand in proper position as previously indicated, the wedge screw assembly may be manipulated by turning the torque rod 47 to wedge a post 49 of appropriate length in position between the core drill stand and the superjacent portion of the ceiling or other reaction member which may be present for wedging purposes. Prior to initiating any drilling operations, it is contemplated that the two outrigger arms 20 will be swung inwardly toward each other until they engage the opposite sides of the core drill 110 as shown in dotted lines in FIG. 5. The inertia of these two arms 20 is adequate to steady the rotating core drill immediately prior to the drilling operation and before the core drill finds a center on the surface undergoing drilling. After the core drill has found such a center, the two arms 20 may then be swung to an out-of-the-way position as shown in full lines in FIG. 5.

Drilling operations are commenced by manipulating the operating handle assembly 78 so as to rotate the main operating shaft 74 in a direction to cause the pinion 76 to travel downwardly on the rack 60, thus moving the carriage 70 downwardly and feeding the core drill 110 into the work. This feeding of the core drill under the influence of the operating handle assembly 78 may be regarded as a coarse adjustment of the carriage feed. Such a feed can be attained only when the operating handle 90 for the eccentric sleeve 88 is in its upwardly projecting vertical position so that the worm 84 will be out of engagement with the worm wheel 82. Otherwise, the operating handle assembly 78 would be incapable of transmitting idle motion through the pinion 82 to the worm 84.

For a fine adjustment or feed of the core drill 110, as, for example, when a given depth of cut has been attained and it is necessary to increase the power which is applied to the feed, the fast spin-type of crank 92 may be employed. To render this crank effective, it is only necessary to position the operating handle 90 so that it projects vertically downwardly, thus shifting the position of the eccentric sleeve 88 so that the worm 84 meshes with the worm wheel 82. Manipulation of the crank 92 will then cause turning movement of the main operating shaft 74 at a slow rate of speed and with the application of appreciably greater downward thrust to the core drill 110. The main operating handle assembly 78 will, of course, follow the slow turning movements of the shaft 74.

After the desired degree of cutting depth has been attained or when a given piece of work has been completely drilled, the operating handle 90 is moved to its vertical upper position in order to disengage the worm 84 from the worm wheel 82 and then the operating handle assembly 78 is turned in the proper direction to retract the core drill and its associated core from the work. Thereafter, the torque rod 47 may be manipulated to release the drill stand so that it may be removed from the drilling area.

When the core drill stand is employed for horizontal drilling purposes, the entire stand may be lifted by the operator to the position wherein it is fragmentarily shown in FIG. 6 and the anchor bolt 28 applied as previously described. The weight of the stand and its associated carriage 70 is not so great that it is not within the capabilities of an operator so to hoist the stand to its horizontal position. Ordinarily, especially where a large size core drill is to be employed, the stand including only the base 10 and the standard 32 will be attached to the wall surface, after which the carriage casting 70 may be applied, followed by application of the motor and core drill spindle unit 100, and finally by attachment of the core drill 110 to the spindle 108. Operation of the core drill stand in its horizontal position is substantially the same as its operation for vertical drilling purposes.

The invention is not to be limited to the exact arrangement of parts shown in the accompanying drawings or described in this specification as various changes in the details of construction may be resorted to without departing from the spirit or scope of the invention. Therefore, only insofar as the invention is particularly pointed out in the accompanying claims is it to be limited.

Having thus described the invention what I claim as new and desire to secure by Letters Patent is:

1. A core drill stand designed to be positioned against a supporting surface and comprising a base member, a hollow tubular standard having its lower rim seated upon said base member and projecting vertically upwardly from the base, a closure cap member seated upon the upper rim of the standard, a pair of tension rods disposed within said standard and extending between said members, means fixedly anchoring certain adjacent ends of said rods to one of the members, means adjustably securing the opposite adjacent ends of the rods to the other member whereby the tension in said rods may be regulated, said rods existing under tension and thus serving to draw the lower rim of the standard hard against the base member and afford stability to the standard, said standard and base member being provided with coplanar forward side surfaces disposed in edge-to-edge contiguity, an elongated vertical rack fixedly secured to the forward side surface of the standard, lying flush therewith, and projecting downwardly so as to overhang the same and present a lower portion which lies flush with the forward surface on the base member, means fixedly securing the lower overhanging portion of the rack to said forward surface on the base member, a carriage mounted for vertical movement on said standard, a pinion on said carriage in constant mesh with said rack, an operating handle connected to the pinion for rotating the latter to effect vertical movement of the carriage, a composite motor and core drill spindle unit adapted for attachment to said carriage for movement in unison therewith, and cooperating means on said unit and carriage for releasably securing the former to the latter.

2. A core drill stand as set forth in claim 1 and wherein the standard is rectangular in cross section and the tension rods extend diagonally through the confines of said standard between different opposed corners of the latter so as to extend at a slight angle to each other.

3. A core drill stand as set forth in claim 1 and wherein said coplanar surfaces on the standard and base member constitute forward side surfaces thereof, and the base member is of four-sided configuration so as to present front and rear corner regions, said stand further including a pair of wheels mounted at the rear corners of the base member, a pair of depending supporting legs at the front corners of the base member, an additional supporting leg at the rear edge of the base member medially of such edge, and a pair of pivoted outrigger arms connected at their proximate ends to the base at the front corners thereof and having their distal ends spaced slightly above the level of the supporting surface when the base member is supported thereon.

4. A core drill stand as set forth in claim 3 and wherein the proximate ends of said outrigger arms are pivoted to the base for swinging movement between widely separated positions and proximate positions wherein their distal ends bear against the sides of a core drill mounted on said composite motor and core drill spindle unit.

5. A core drill stand as set forth in claim 1 and including, additionally, a worm wheel on said carriage and connected to the pinion for rotation in unison, a worm movable into and out of engagement with said worm wheel between operative and inoperative positions, a crank connected to said worm wheel, and means for manually moving said worm between its operative and inoperative positions.

6. A core drill stand as set forth in claim 5 and wherein said pinion and worm wheel are mounted on a common shaft rotatable on the carriage, and said means for manually moving the worm comprises a rotatable sleeve within which the shaft is eccentrically journalled, and an operating handle connected to said sleeve.

7. A core drill stand as set forth in claim 1 and wherein the cooperating means on the motor and core drill spindle unit and carriage comprises a tapered vertical dovetail groove on the carriage and a cooperating tapered dovetail protuberance on the unit, the direction of dovetail taper being such that the dovetail opens in a downward direction whereby upward thrust on the carriage due to drilling pressure serves to enhance the interlocking engagement between the cooperating dovetail parts.

References Cited

UNITED STATES PATENTS

| | | | |
|---|---|---|---|
| 1,928,048 | 9/1933 | Currens | 173—141 X |
| 2,094,936 | 10/1937 | Woodnal | 77—20 |
| 2,260,635 | 10/1941 | Musselman | 77—20 |
| 2,887,910 | 5/1959 | Williamson | 77—20 |
| 3,148,001 | 9/1964 | Johnson | 173—141 X |

NILE C. BYERS, JR., *Primary Examiner.*